Aug. 11, 1931.     P. R. FORMAN     1,818,703
UNIVERSAL CONTROL VALVE
Filed Nov. 19, 1927    2 Sheets-Sheet 1
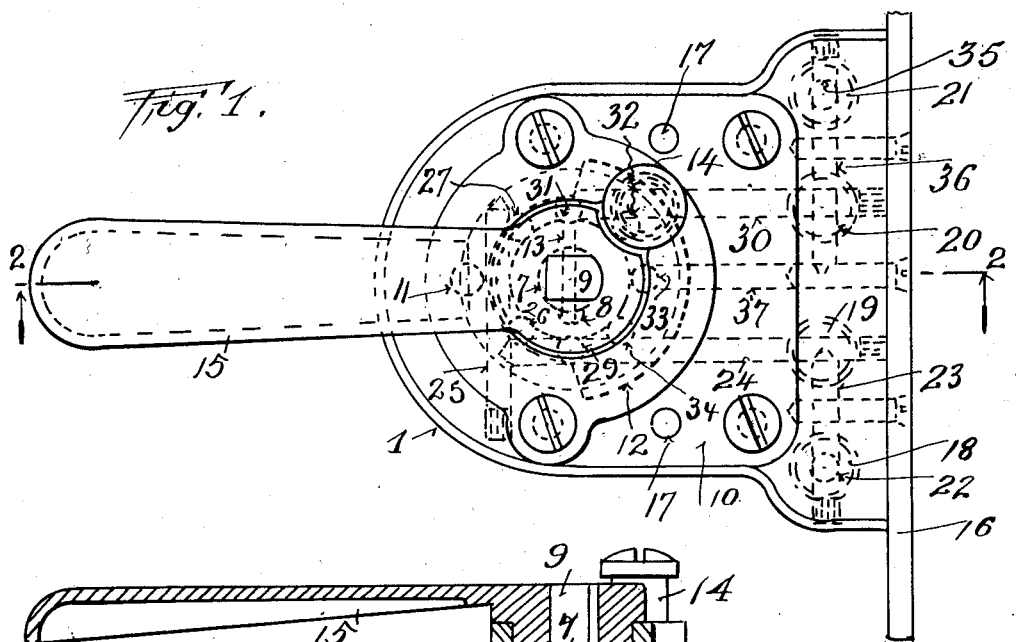
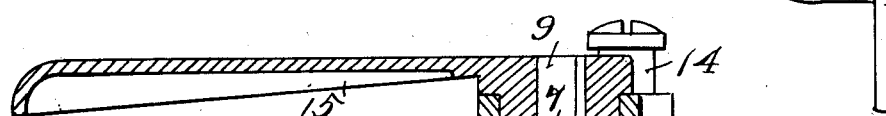
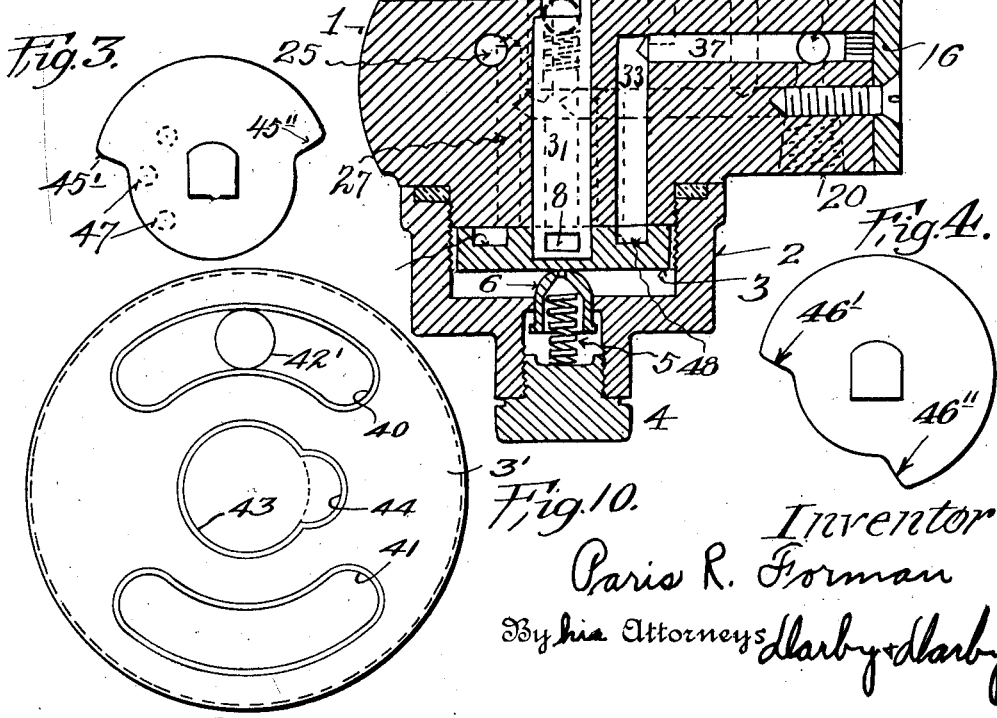

Aug. 11, 1931.  P. R. FORMAN  1,818,703
UNIVERSAL CONTROL VALVE
Filed Nov. 19, 1927   2 Sheets-Sheet 2
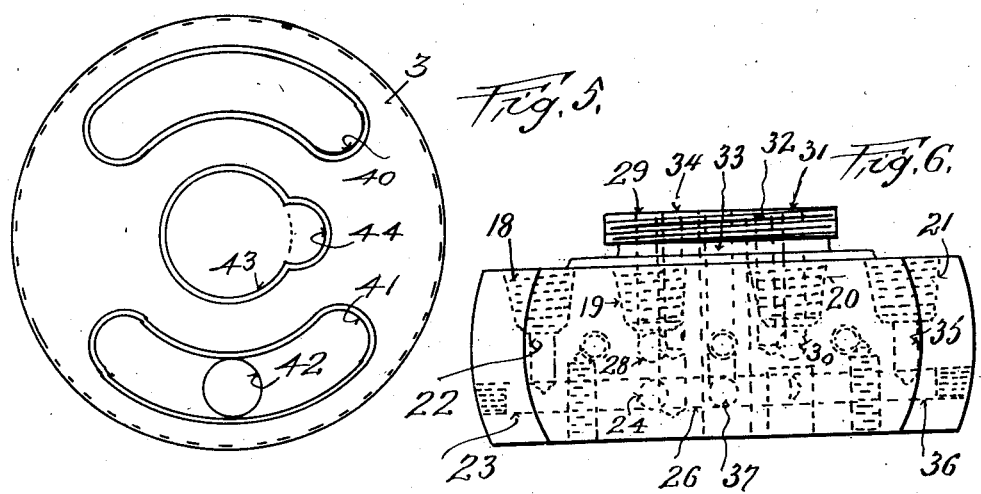
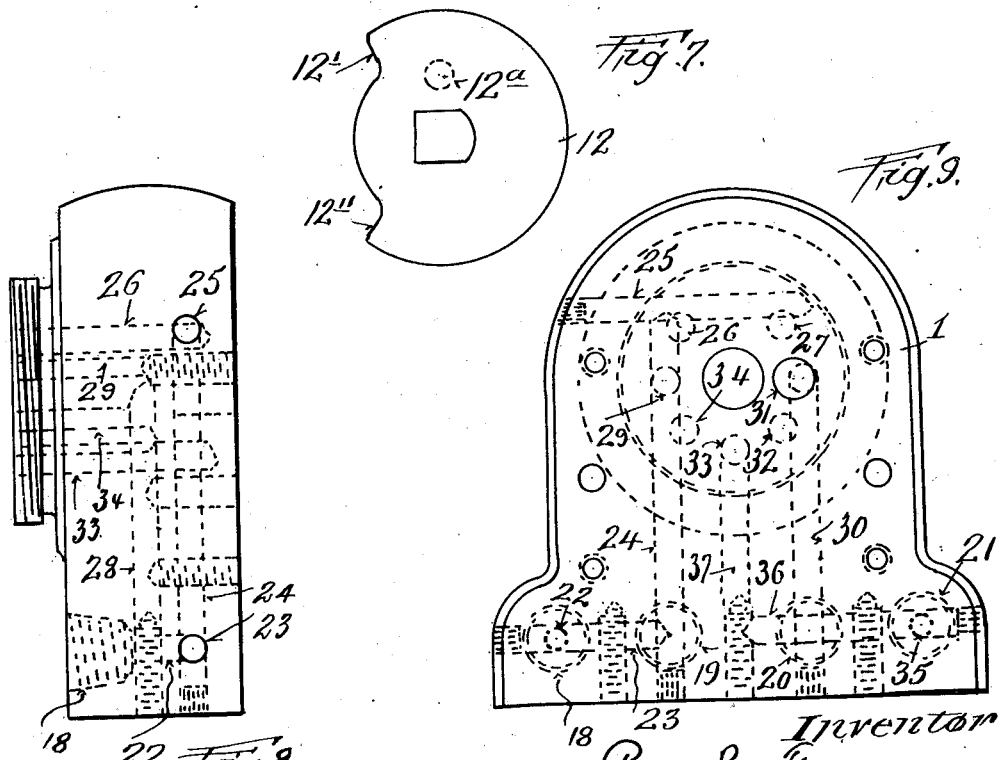
Inventor
Paris R. Forman
By his Attorneys
Darby & Darby Patented Aug. 11, 1931

1,818,703

UNITED STATES PATENT OFFICE

PARIS R. FORMAN, OF RAHWAY, NEW JERSEY, ASSIGNOR TO NATIONAL PNEUMATIC COMPANY, OF NEW YORK, N. Y., A CORPORATION OF WEST VIRGINIA

UNIVERSAL CONTROL VALVE

Application filed November 19, 1927. Serial No. 234,539.

This invention relates in general to control valves for use in fluid pressure circuits.

One of the objects of this invention is the provision of a control valve having interchangeable parts to modify it in operation to provide three distinct types of control valves.

Another object of this invention is the provision of a universal control valve having a stop-plate adapted to limit the movement of the control valve.

Another object of this invention is the provision of a plurality of stop-plates for use on valves of this type which are intended to predetermine the limits of operation of the valve to produce various interconnections between passages in the valve body.

A still further object of this invention is the provision of a control valve constructed for cooperation with a plurality of valves to produce a control unit in which various interconnections between passages may be effected.

A further object of this invention is the provision of a construction arranged so that the handle for operating the valve may only be applied and removed from the valve when it is in a given position.

A still further object of this invention is the provision of means for holding the valve on its seat.

A further object of this invention is the provision of a spring pressed member for frictionally engaging the stop-plates so as to maintain the valve in a number of predetermined positions.

These and other objects as will appear from the following disclosure are attained by means of the construction of this invention.

This invention resides substantially in the combination, construction, arrangement and relative location of parts all as will appear more fully hereinafter.

Referring to the drawings which are included for purposes of illustration,

Figure 1 is a top plan view of the valve of this invention showing the handle in position to permit its removal from the valve, Fig. 2 is a vertical cross-sectional view taken on the line 2—2 of Fig. 1 looking in the direction of the arrows, Figs. 3, 4 and 7 disclose the three forms of stop-plates employed with the valve of this invention, Fig. 5 is a plan view of the valve member itself in one form, Fig. 6 is an end elevational view of the valve body, Fig. 8 is a side elevational view of the valve body, Fig. 9 is a top plan view of the valve body, and Fig. 10 is a plan view of the valve member in another form and interchangeable with the form shown in Fig. 5.

In the use of various fluid pressure operated devices such as pneumatic motors of which there are a number of forms it is necessary to employ some form of control valve for making the proper connections between the motor and the fluid pressure source in order to cause the operation thereof. There are, for instance, fluid pressure motors of the double piston type or two-pipe type, in which fluid pressure is admitted to one end of the motor while the other end is permitted to exhaust. In another type known as the single piston or one-pipe motor fluid pressure is admitted to and exhausted from the engine through a single pipe. The valve of this invention may be changed to permit its use with either type of engine. On vehicles having a door at each end on each side in which the single pipe engine is used to operate the doors after one of the doors on one end has been opened it is sometimes desired to open the other door on the same side. The valve of this invention is constructed to accomplish this purpose and is further arranged to accomplish this purpose with respect to both side of the vehicle. The various passage and port combinations in the valve necessary to effect the operation indicated above may be secured by means of the valve of this invention by the mere interchange of two simple parts. To more clearly understand the nature of the invention and the construction thereof reference will now be made to the drawings.

The valve is shown at 1 comprising a main body portion having a threaded extension to receive the internally threaded hollow cap 2. Mounted against the lower face of the valve body and within the cap is the valve 3 which is held on its seat by means of the thimble 6 and the spring 5. The spring 5 and thimble 6 are maintained in operative relation in a recess in a cap 2 by means of a threaded plug 4. A rotatable valve stem 7 is shown mounted in the valve body and is provided at its lower end with a projection 8 which fits within a recess 44 in the valves 3 and 3′ (Figs. 5 and 10). The upper end of the valve stem is milled into a substantial D-shaped formation as at 9. The upper portion of the valve is provided with a cap 10 which is secured to the valve body by means of screws. Mounted within the cap is a short projection 11 the purpose of which will be described later. Mounted on the stem is a notched plate 12 which is held thereon by means of the pin 13 which extends through the valve stem. A threaded screw 14 having a smooth straight shank portion is mounted in the cap 10 and serves to prevent the removal of the handle 15 from the valve stem except when it is in its central position as is clearly shown in Figure 1. A portion of the cylindrical surface of the valve handle is milled away to permit it to be placed on to the valve stem. A central bore is provided in the shank of the handle of substantial D-shaped formation so as to engage the same in one position only and to prevent turning of the handle on the stem. A flat plate 16 is supported on the valve block and serves as a means for attaching the valve to any desired support. Two pins 17 permanently mounted in the valve body engage holes in the cap so that the cap may be applied to the valve body in correct position only.

Extending upwardly in the valve body near the supporting plate are 4 tapped holes to which the various circuit pipes may be attached. These are shown at 18, 19, 20 and 21. The opening 18 to which the pressure pipe which supplies fluid pressure from the source is attached connects to a short vertically extending passage 22 which in turn connects into the transversely extending horizontal passage 23. This passage 23 connects with the longitudinally extending horizontal passage 24 which in turn opens into the transverse horizontally extending passage 25. Two vertically extending passages 26 and 27 intersect with and open into the passage 25. The threaded opening 19 connects with the longitudinally extending horizontal passage 28 which opens into the vertical passage 29. The threaded opening 20 connects with the longitudinally horizontally extending passage 30 which in turn connects with the vertical passage 31. A vertical passage 32 intersects with the passage 30 and the vertical passage 34 intersects with the passage 24. The threaded opening 21 is connected by the vertical passage 35 with the transversely extending horizontal passage 36 which connects with the vertical passage 36 through the longitudinally extending horizontal passage 37. Each of the passages 26, 27, 29, 31, 32, 33 and 34 extend to and through the face of the valve on which the valve seat 3 rotates.

The valve itself is shown in plan view in two forms in Figs. 5 and 10 and has two arcuate grooves 40 and 41 in one face thereof. The groove 41 in valve 3 is provided with a hole 42 extending completely through the valve. A circular recess 43 is provided for receiving the end of the valve stem and has a notch 44 therein for receiving the projection 8 of the valve stem to cause the conjoint rotation of the valve stem and valve. Valve 3′ in Fig. 10 is similar except hole 42′ is in groove 40.

In Figs. 3, 4 and 7 are shown the three types of stop-plates used in connection with this valve. The stop-plate shown in Fig. 3 consists of an interrupted circular piece 45 having the two shoulders 45′ and 45″. Three circular depressions 47 are formed in one face of the stop-plate. This particular form of stop-plate is used in connection with the valve shown in Fig. 3 to provide a complete control valve which may be used for controlling two one-pipe door engines selectively or in unison.

In Fig. 4 the stop-plate 46 is shown with the two shoulders 46′ and 46″ and is used in connection with the valve shown in Fig. 5 to provide a control valve for use with the two-pipe engine.

The stop-plate shown in Fig. 7 at 12 is provided with the shoulders 12′ and 12″ and with the circular depression 12$^a$. This stop-plate used in conjunction with the valve in Fig. 5 provides a control valve for use in systems employing two separate one-pipe engines.

As will be apparent from the drawings the main distinction from the stop-plates shown in Figs. 3, 4 and 7 lies in the circular distance between the shoulders on the disc and their position with respect to the central D-shaped opening which receives the valve stem. The stop 11 mounted within the cap 10 provides a shoulder against which the notches on these plates may contact to limit the movement of the valve.

A small steel ball 50 (Fig. 2) lies within a recess in the valve body and is pressed by means of a spring upwardly against the under surface of the stop-plate. This ball provides frictional resistance to the movement of the stop-plate and is intended in connection with stop-plates 45 and 12 to fall within the recess 47 and 12$^a$ respectively to provide means for indicating the various positions of the valve and further to provide means to maintain the valve in these positions.

The particular arrangement of the passages within the valve body and ports on the face thereof does not appear to be absolutely essential in order to make the proper disclosure of this invention since the novel features thereof and principles of the invention may be applied to control valves having various combinations of passages and ports. A somewhat detailed disclosure of the various connections which may be effected by means of this valve will, however, be given.

When the valve is provided with the stop-plate 46 (Fig. 4) and the valve 3' (Fig. 10) the following operations may be carried out. With the parts arranged as above assumed the valve may be used for controlling a single two-pipe engine. Fluid pressure is fed from the source to the threaded opening 18 which in all forms of the valve is known as the pressure opening. Fluid pressure then travels through passages 22, 23, 24, 25 and there stops when the handle is in the door closed position which is the position shown in Figure 1. In this case shoulder 46" will lie against the stop-pin 11. When the handle is moved downwardly (Figure 1) until the shoulder 46' lies against stop pin 11 fluid pressure passes through passage 26 from passage 25 through groove 40 of valve 3 to passage 29, passage 24 and thence out through threaded opening 19 to one end of the door engine. The other end of the door engine which is connected by a pipe through the threaded opening 20 exhausts through passages 30 and 31, groove 41 in the valve 3, passages 33, 37, 36 and thence to and through the threaded opening 21 which is open to the atmosphere. This operates the engine to open the door. Upon returning the valve handle to the position shown in Figure 1 connections are effected between the threaded openings 18 and 20 so that fluid pressure is admitted to the other end of the engine to cause it to close the doors. At the same time the end of the engine to which fluid pressure was admitted to open the doors is connected to the atmosphere through the threaded opening 21 so that that end of the engine may exhaust. In this arrangement it will be apparent that the valve handle has but two positions for effecting the opening and closing of doors. It is hardly necessary to point out that doors have been referred to as being operated by the engines for purpose of illustration since the invention is applicable to fluid pressure operated engines for any use.

When the stop-plate 12 and the valve 3 are applied to the control valve it may be used for operating two separate one-pipe engines. In this combination of parts the hole 42 lies in the full line position. It may be pointed out here that the purpose of this hole through the valve is to admit fluid pressure to the under surface of the valve to aid in holding it on its seat in conjunction with the spring pressed thimble 6. The stop-plate 12 fits on the valve stem so that when the handle is in the position shown in Figure 1 neither shoulders 12' or 12" are in contact with the stop-pin 11. When the handle of the valve is moved for instance upwardly (Figure 1) shoulder 12" will contact with the stop-pin 11. In this position the threaded openings 18 and 19 will be connected through the ports and passages of the valve so that fluid pressure will be supplied to one of the one-pipe engines to cause it to open the door connected thereto. When the valve handle is moved downwardly (Figure 1) so that the shoulder 12' is in contact with the stop-pin 11 the threaded openings 18 and 20 will be connected through the ports and passages of the valve to cause the other one-pipe engine to open the door connected thereto. When the handle is moved from either of these positions to its central position (Figure 1) the particular engine energized will be connected through the ports and passages of the valve to the exhaust opening 21. This permits the door to return to its closed position. Thus in the first case when the handle moves from its upward position to its central position the energized engine will be opened to exhaust and when the handle moves from its lower position to its central position the other energized engine will be opened to exhaust. It will be understood that this combination of parts provides a single valve for operating two one-pipe engines independently and when the valve handle is in its central position (Figure 1) neither engine will be energized and the doors connected thereto will be closed.

When the stop-plate 45 (Fig. 3) and the valve 3 (Fig. 5) are applied to the valve body it is adapted for use for operating two one-pipe door engines selectively or in unison. The handle of this control valve has five positions. When the handle is in its central position (Fig. 1) the two motors are de-energized and the doors are closed. In this position the spring pressed ball 50 will engage the uppermost depression 47 (Fig. 3). When the handle is moved upwardly (Fig. 1) until the next lower depression 47 engages the spring pressed ball which is about one-half the upward swing of the handle one of the engines is energized to open the door connected thereto. In this position of the valve connections are established between the openings 18 and 19 through the ports and passages of the valve to energize the engine connected to the opening 19. If it is desired to energize the other engine to cause the door connected thereto to also open the handle of the valve is moved further upwardly (Fig. 1) until the shoulder 45" contacts with the stop-pin 11. In this case openings 18 and 20 are also connected through the ports and passages of the valve so that the other engine which is connected to the opening 20 is also energized causing the door connected thereto to open. In this position the lowermost depression 47 (Fig. 3) is engaged by the spring pressed ball 50. It will be apparent that the spring pressed ball cooperating with these depressions serves to guide the operator of the valve and to maintain the valve in each of these three positions. Upon returning the handle from either of its two upward positions to its central position both openings 19 and 20 will be connected through the ports and passages of the valve to the exhaust opening 21 whereupon the engines return the doors to closed position. The valve handle likewise has two downward positions (Fig. 1) in which case the engines will be operated in reverse order. Thus the engine which operated last when the handle was moved upwardly will operate first and the engine which operated first will operate last. Thus in the first of the two downward positions openings 18 and 20 are connected through the ports and passages of the valve and in the full downward position openings 18 and 19 are connected through the ports and passages of the valve. When the handle is returned to its central position both openings 19 and 20 will be connected to the opening 21 through the ports and passages of the valve to permit the engines to exhaust and close the doors connected thereto. In the full downward position of the handle (Fig. 1) shoulder 45' of the stop-plate will engage the stop-pin 11.

It is believed that the complete tracing of each and every fluid pressure circuit through the valve for all the possible operations indicated above will only serve to confuse the disclosure of this invention. Each port and passage as well as the grooves in the valve have been completely shown in their correct relation and anyone skilled in the art can readily construct the device of this invention.

I am well aware that many changes in the detail of construction and relative association of parts will suggest themselves to those skilled in the art and I do not, therefore, desire to be limited to my exact disclosure as given for purpose of illustration, but rather to the invention as I define it in the appended claims.

What I seek to secure by United States Letters Patent is:

1. In a universal control valve the combination with a valve body having a plurality of ports and passages therein, and a valve having grooves for cooperation with said ports of interchangeable means for controlling and predetermining the various interconnections possible between said ports and passages.

2. In a universal valve construction the combination with a valve body having a plurality of ports and passages and a movable value for cooperation with said ports of interchangeable stop-plates movable with said valve for cooperation with a fixed stop for predetermining the connections between said ports and passages.

3. In a universal valve construction the combination with a valve body having a plurality of ports and passages of interchangeable stop-plates for cooperation with a fixed stop and interchangeable valves for controlling conjointly with said stop-plates the connections between said ports and passages.

4. In a universal valve construction the combination with a valve body having a plurality of ports and passages and a movable valve of interchangeable stop-plates for cooperation with a fixed stop for predetermining the connections established by said valve between said ports and passages, and frictional means for engaging the stop-plate in use to hold the valve in its various positions.

5. In a universal valve the combination with a valve body having a plurality of ports and passages, a valve, a valve stem for rotating said valve having a stop-plate thereon and means in a recess in said valve body for frictionally engaging said stop-plate to hold the valve in a number of predetermined positions.

6. In a universal control valve the combination with a valve body having a plurality of ports and passages therein, a valve having grooves for cooperation with said ports, and means for moving said valve with respect to said valve body. of means comprising interchangeable plates of predetermined shape for movement with said valve for predetermining the connections that can be made between said ports, grooves and passages.

In testimony whereof I have hereunto set my hand on this 16th day of November, A. D. 1927.

PARIS R. FORMAN.